United States Patent
Huang et al.

(10) Patent No.: US 6,195,121 B1
(45) Date of Patent: *Feb. 27, 2001

(54) SYSTEM AND METHOD FOR DETECTING AND ANALYZING A QUEUE

(75) Inventors: Jianzhong Huang, Snellville, GA (US); Dinei A. F. Florencio, Plainsboro, NJ (US)

(73) Assignee: NCR Corporation, Dayton, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 09/313,750

(22) Filed: May 27, 1999

Related U.S. Application Data

(60) Division of application No. 08/811,326, filed on Mar. 4, 1997, which is a continuation-in-part of application No. 08/694,365, filed on Aug. 8, 1996, now abandoned.

(51) Int. Cl.[7] ................................................. H04N 7/18
(52) U.S. Cl. ........................ 348/150; 348/144; 348/155
(58) Field of Search ................................. 348/143, 139, 348/142, 144, 149, 150, 152, 153, 155, 159, 151, 147, 161, 170, 171; 340/541, 917, 933; 382/104; H04N 7/18

(56) References Cited

U.S. PATENT DOCUMENTS

| | | | |
|---|---|---|---|
| 4,249,207 | * 2/1981 | Harman et al. | 348/152 |
| 4,337,482 | 6/1982 | Coutta | 358/108 |
| 4,630,110 | 12/1986 | Cotton et al. | 358/108 |
| 4,737,847 | 4/1988 | Araki et al. | 358/108 |
| 4,839,631 | 6/1989 | Tsuji | 340/541 |
| 4,928,175 | 5/1990 | Haggrén | 358/108 |
| 5,097,328 | 3/1992 | Boyette | 358/108 |
| 5,121,201 | 6/1992 | Seki | 358/108 |
| 5,243,418 | 9/1993 | Kuno et al. | 358/108 |
| 5,278,643 | 1/1994 | Takemoto et al. | 358/108 |
| 5,296,852 | 3/1994 | Rathi | 340/933 |
| 5,402,117 | 3/1995 | Zijderhand | 340/905 |
| 5,402,167 | 3/1995 | Einbinder | 348/152 |
| 5,408,330 | 4/1995 | Squicciarini et al. | 358/335 |
| 5,465,115 | 11/1995 | Conrad et al. | 348/155 |
| 5,509,082 | 4/1996 | Toyama et al. | 382/104 |
| 5,512,942 | 4/1996 | Otsuki | 348/143 |
| 5,526,041 | * 6/1996 | Glatt | 348/143 |
| 5,581,297 | 12/1996 | Koz et al. | 348/152 |
| 5,581,625 | 12/1996 | Connell | 382/1 |
| 5,598,338 | 1/1997 | Taniguchi et al. | 364/436 |
| 5,666,157 | 9/1997 | Aviv | 348/152 |
| 5,880,775 | * 3/1999 | Ross | 348/143 |
| 5,953,055 | * 9/1999 | Huang et al. | 348/155 |

OTHER PUBLICATIONS

SPIE vol. 1507, *Intelligent Robots and Computer Vision X: Algorithms and Techniques* (1991), "Robust Object Detection Under Various Environmental Conditions", Eisaku maeda and Kenichiro Ishii, May 1992.

* cited by examiner

Primary Examiner—Andy Rao
Assistant Examiner—Gims Philippe
(74) Attorney, Agent, or Firm—Peter H. Priest

(57) ABSTRACT

A system and method are provided for detecting, collecting information about, and analyzing a queue. A video camera is positioned to view the queue, and a sequence of video images from the camera may be processed in order to perform the functionality of the present invention. The present invention may be implemented at checkout lanes in a retail establishment, in a bank, at customer service desks, at self-service kiosks, at banks, or any other location where a queue (line) of people or other objects may form. After detecting the queue, the present invention, may collect multi-dimensional information regarding the queue, including the number of people, etc., in the queue, the average service time for each person in the queue, as well as various other types of information regarding the queue. The present invention may thereafter analyze the collected information in various ways, based upon various criteria. For example, a retailer may use the analyzed information to minimize service time for people in a checkout line, in a way which makes economic sense.

13 Claims, 8 Drawing Sheets

SYSTEM AND METHOD FOR DETECTING AND ANALYZING A QUEUE

CROSS-REFERENCE TO RELATED APPLICATION

This patent application is a division of 08/811,326 filed Mar. 4, 1997 which is a continuation-in-part of co-pending U.S. patent application Ser. No. 08/694,365, entitled "System for Analyzing Movement Patterns in a Localized Zone", filed Aug. 8, 1996

BACKGROUND OF THE INVENTION

1. Field of the Invention

The present invention generally relates to a system and method for detecting and analyzing movement patterns of people or objects in a queue. In particular, the present invention is able to detect and record the number of people in the queue, the length of time the people have been waiting in the queue, as well as other characteristics of the queue. In one embodiment, the present invention may be utilized in a retail store environment to track customer activity.

2. Description of the Prior Art

In retail establishments, such as grocery stores, department stores, and the like, customer satisfaction is of paramount importance. Satisfied customers become repeat customers, and unhappy customers may become former customers. It has become common for retailers to use various techniques to gauge customer satisfaction. For example, a customer satisfaction index may consist of a customer's perception of price, product availability, friendly service, checkout efficiency, and other attributes. It has been suggested that there is a direct correlation between such an index and sales revenue.

As noted above, checkout efficiency is a common measurement of customer satisfaction. That is, a customer's satisfaction is directly related to, among other factors, the amount of time the customer waits in a queue (line) in order to purchase the goods. For example, an average service time can be used to measure the amount of time spent by customers waiting to exit the store.

Many retailers currently manage staffing based on transaction frequency and cashier/checker productivity. It is common for retailers to continually try to determine the number of checkout lanes required in their stores. By analyzing the total number of customers waiting to check out, it is possible to do better estimates of the number of checkout lanes required. Also, more accurate labor scheduling can be performed, since a historical analysis of peak checkout periods can be based on the number of customers waiting to be served, rather than transaction frequency. This allows the retailer to optimize store operations.

Unfortunately, no efficient way currently exists for a retailer, or anybody else, to effectively and continually determine characteristics of a queue in real-time. While it is possible for the retailer to assign the responsibility of monitoring the queue(s) to a dedicated employee, or even to the cashiers themselves, these manual methods prove to be cost prohibitive or at least quite unreliable. The cost associated with a dedicated person, and the difficulty of keeping accurate statistics by hand, cause a manual approach to analyzing queues to be wholly unsatisfactory.

There is therefore a significant need in the art for an efficient and automated system and method for analyzing various characteristics of a queue of people, or any other items that may form in a line.

SUMMARY OF THE INVENTION

According to the teachings of the present invention, a system and method are provided for detecting, collecting information about, and analyzing a queue. A video camera is positioned to view the queue, and a sequence of video images from the camera may be processed in order to perform the functionality of the present invention. The present invention may be implemented at checkout lanes in a retail establishment, in a bank, at customer service desks, at self-service kiosks, at banks, or any other location where a queue (line) of people or other objects may form. After detecting the queue, the present invention may collect multi-dimensional information regarding the queue, including the number of people, etc., in the queue, the average service time for each person in the queue, as well as various other types of information regarding the queue. The present invention may thereafter analyze the collected information in various ways, based upon various criteria. For example, a retailer may use the analyzed information to minimize service time for people in a checkout line, in a way which makes economic sense.

DETAILED DESCRIPTION OF THE INVENTION

1. Overview

Figure 1:
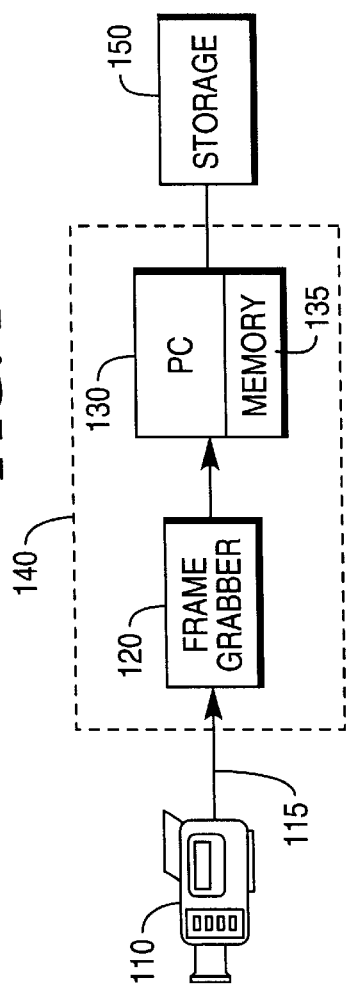
FIG. 1 is a block diagram of the present invention in one embodiment.

FIG. 1 depicts the overall structure of the present invention in one embodiment.

The hardware components of the present invention may consist of standard off-the-shelf components. The primary components in the system are one or more video cameras 110, one or more frame grabbers 120, and a processing system 130, such as a personal computer (PC). The combination of the PC 130 and frame grabber 120 may collectively be referred to as a "video processor" 140. The video processor 140 receives a standard video signal format 115, such as RS-170, NTSC, CCIR, PAL, from one or more of the cameras 110, which can be monochrome or color. In a preferred embodiment, the camera(s) can be mounted or positioned to view a selected area of interest, such as a checkout lane in a retail establishment, an automated teller machine (ATM), or any other localized area where people (or even other objects) wait for service, i.e. form queues.

The video signal 115 is input to the frame grabber 120. In one embodiment, the frame grabber 120 may comprise a Meteor Color Frame Grabber, available from Matrox. The frame grabber 120 operates to convert the analog video signal 115 into a digital image stored within the memory 135, which can be processed by the video processor 140. For example, in one implementation, the frame grabber 120 may convert the video signal 115 into a 640×480 (NTSC) or 768×576 (PAL) gray level image. Each pixel may have 8 bits of resolution.—8 bits of resolution is usually sufficient, and color data could be used to increase system performance. Of course, a variety of other digital image formats and resolutions may be used as well, as will be recognized by one of ordinary skill.

After the digital image has been created in memory 135, analysis of the video image may begin. All analysis is preferably performed on the PC 130, but may also be performed by any other suitable means.

2. Queue Analysis Overview

Figure 2:
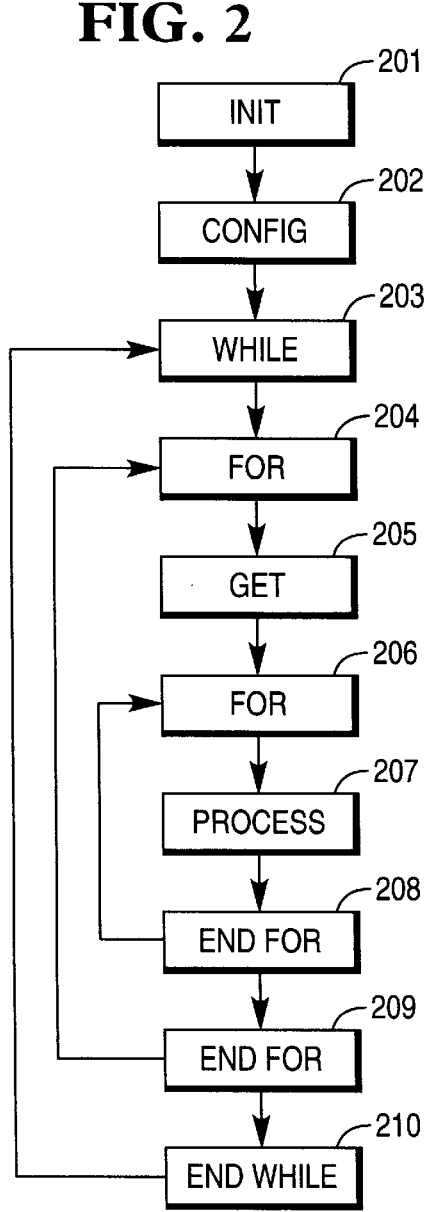
FIG. 2 is a flow diagram depicting a process performed by the present invention in one embodiment.

The high level control flow for the present invention, performed by processing system 130, is described below in both pseudo-code format and in a more detailed format with respect to FIG. 2. Reference is made in [brackets] in the pseudo-code to the steps illustrated in FIG. 2.

```
[201] initialize system parameters
[202] configure video streams
[203] while (true)
    [204] for (j = 0; j < total number of video inputs; j++)
        [205] get next frame from video input j
        [206] for (i=0; i < total number of queues; i++)
            [207] process queue zone i
        [208] end for
    [209] end for
[210] end while
```

Figure 3:
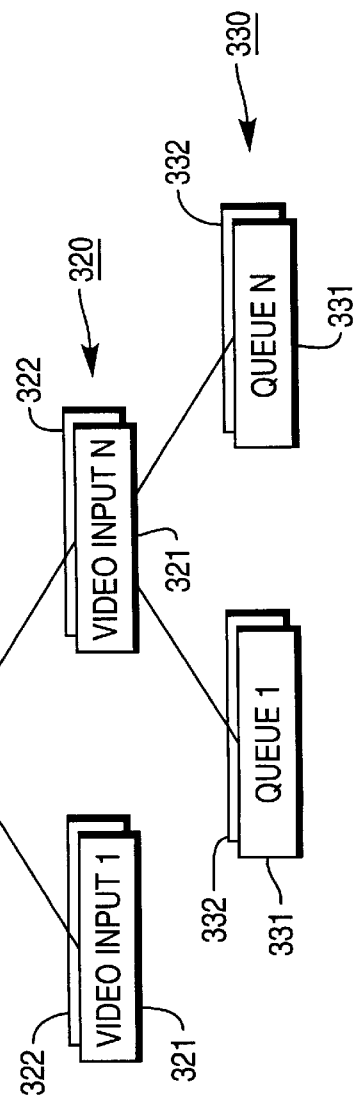
FIG. 3 is a hierarchical tree depicting a data structure that may be used in accordance with the present invention.

In step 201, the system parameters are initialized. System parameters can be viewed as a tree structure, as shown in FIG. 3. The root 310 of the tree is "video inputs", which is the highest level data structure representing the video signal (s) 115. The next level 320 of the tree contains one or more nodes 321, each corresponding to one of the video signals 115—for each video signal 115, there is one node 321. Each node 321 includes as a parameter a frame grabber identifier 322, which identifies the frame grabber 120 assigned to the corresponding video signal 115.

For each video signal 115, the present invention may be implemented to support the analysis of one or more queues. Each queue may be represented by a node 331 in level 330, each node 331 being a child of a node 321.

Associated with each queue being analyzed is a zone identifier 332. Also, a number of other parameters specific to individual queue zones may be specified for each node 331. The following parameters may be created for each queue zone node 331.

Bounding Box:

The bounding box describes the location of the queue zone 420 within the camera view. The location information contains the x,y coordinates of the top left corner of the queue zone 420 and lower right corner of the queue zone 420 in the image coordinate system.

Figure 4A:
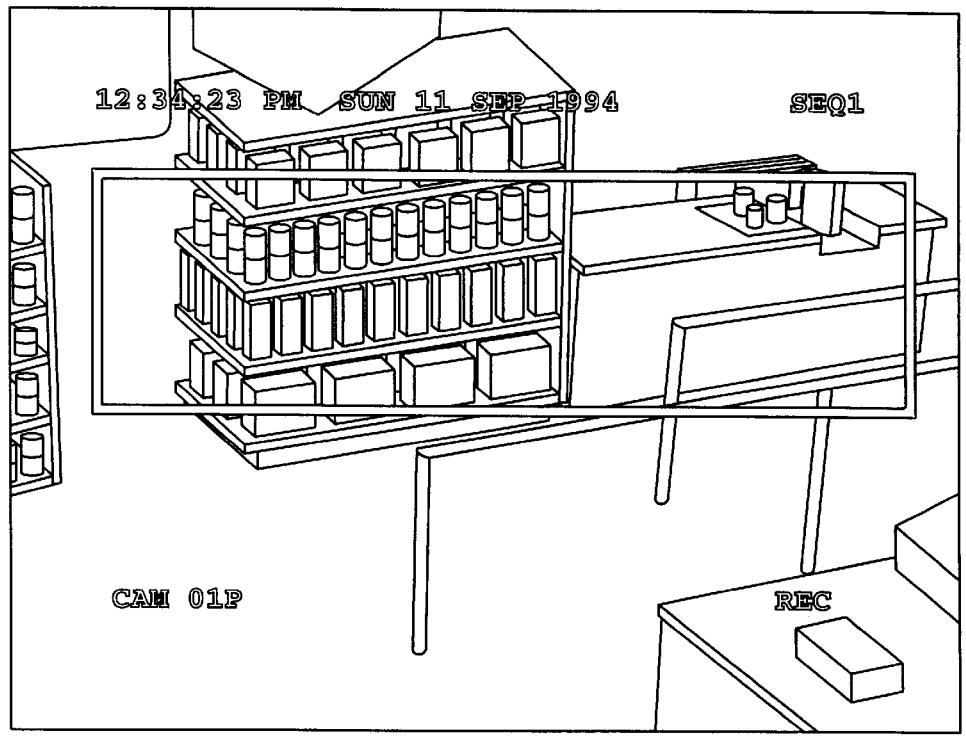
FIGS. 4A and 4B depict exemplary camera views that may be processed by the present invention.
Figure 4B:
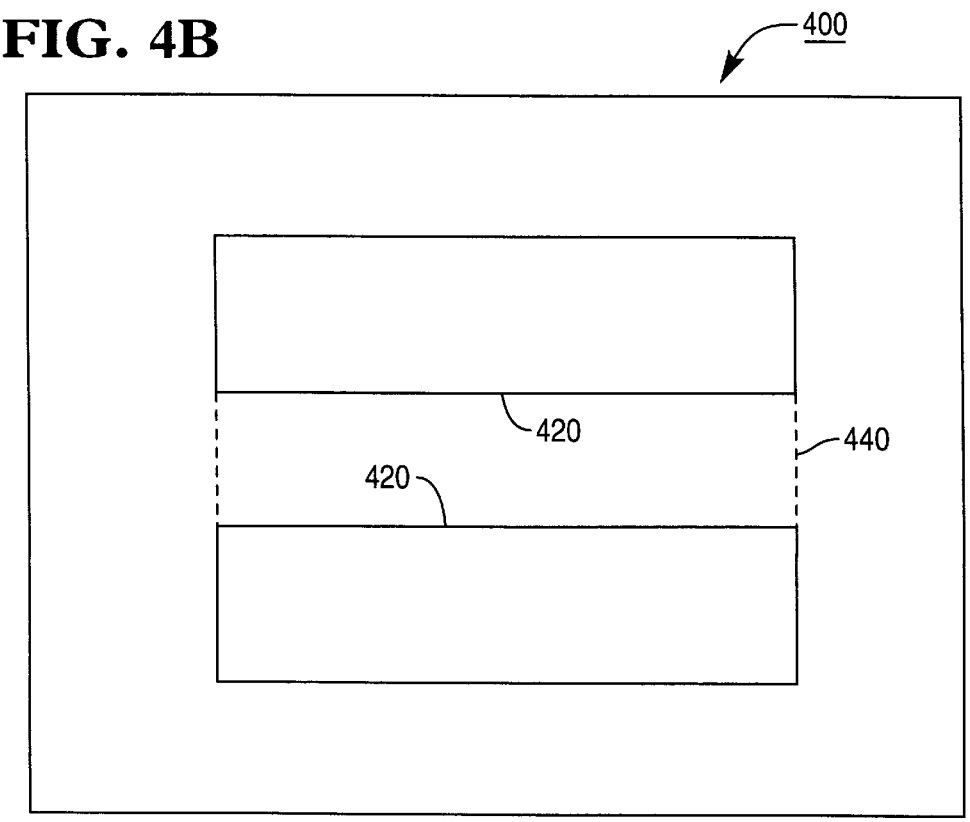

See FIGS. 4A and 4B.

Difference Threshold:

Specifies the difference threshold used when performing the image difference operation. This is described in further detail below.

Also, background adaptation parameters are specified with respect to each queue zone. These are described in detail in section 5.

The following pixel queue analysis parameters may also be created, as described in further detail below.

Slot Direction:

Specifies slot direction, horizontal or vertical.

Number of Slots:

Species the number of slots in a queue zone 420.

Slot Threshold:

Specifies the percentage of pixels that must be different for a slot to be considered occupied.

Time threshold:

Specifies the amount of time a slot must be in a steady state in order for the slot status to change.

The following segment queue analysis parameters may also be created, as described in further detail below.

Minimum Pixels:

Specifies the minimum object size, in pixels, that an object must exceed to be considered a person.

Adjacency:

Specifies the adjacency constraint for region labeling.

Edge Difference Threshold:

Specifies the edge difference threshold when performing the image difference operation.

After initialization in step 201, the video streams are configured in step 202. In order to optimize system resources, CPU 130 and memory 135, it is only necessary to capture and store the portion of the image that will be analyzed by the processing system 130. As shown in FIGS. 4A and 4B, one or more queue zones 420 are defined for the queue being monitored. FIG. 4A illustrates a typical video image captured from camera 110 in a supermarket. The camera 110 is positioned such that a cashier's station 410 is located at one end of the queue zone 420, and the queue of people forms toward the other end. Of course, this arrangement is merely described as an example, and many other configurations are possible. FIG. 4B is a schematic illustration of the video image of another typical view of camera 110, where there are two (e.g., more than one) queue zones 420 arranged with respect to two different queues.

For purposes of the present invention, the queue zones 420 are the only portion of the image that are analyzed by the present invention, although other portions of the image may be analyzed in other ways, such as the looking and passing zones described in co-pending U.S. patent application Ser. No. 08/694,365, entitled "System for Analyzing Movement Patterns in a Localized Zone", filed Aug. 8, 1996, and commonly assigned to the assignee of the present specification. U.S. patent application Ser. No. 08/694,365 is incorporated herein by reference thereto.

The largest window 440 that encloses all queue zones 420 is called the region of interest (ROI). When the present invention is operating, only the ROI 440 need be captured and stored in memory 135. Since the present invention supports multiple cameras 110, each video input stream 115 may be configured independently, based on the ROI 440 for each camera 110 view.

At step 203 (FIG. 2), the present invention begins to process the video input streams 115. The processing system 130 processes each video stream 115 sequentially. For each video input 115, the system 130 obtains the next frame (digital image) (steps 204–209). The system 130 sequentially analyzes each queue 420 that is configured within the camera 110 view. The system 130 sequentially processes each queue 420 using a specified process algorithms, as described below.

Either of two process algorithms may be used in one embodiment for performing queue analysis: a pixel-based queue analysis process or a segment-based queue analysis process. Pixel-based queue analysis is used when analyzing a structured queue. A structured queue is a queue that generally is straight and is formed at the same location. This is very common in supermarket checkout lanes, or for a line of customers waiting to use an automated teller machine (ATM).

Segment-based queue analysis is used when analyzing an unstructured queue. An unstructured queue is a free form queue, where customers loiter rather than forming a line. This is common at customer service desks or service points where customers have a seat and wait to be called. Since the dynamics of the queue are unconstrained, a different approach is used in counting the number of customer in the queue.

3. Pixel-Based Queue Analysis

In pixel-based queue analysis, it is assumed that customers waiting in a queue form a relatively straight line. Again, this is very common in supermarket checkout lanes, or for a line of customers waiting to use an ATM. The bounding box for the queue zone 420 corresponds to the location of the queue in the image 400.

Below is the pseudo code for the pixel-based queue algorithm which is performed by the processing system 130 using the video image stored in memory 135. Again, reference is made in [brackets] in the pseudo-code to the steps of FIG. 5.

```
[501] For (i = 0; i < number of queue zones; i++)
    [502] extract the region of interest for zone i
    [503] generate the background image difference
    [504] for (j = 0; j < number of slots; j++)
        [505] analyzeSlot(j)
    [506] end for
    [507] update current background
    [508] inLine = 0
    [509] for (j = 0; j < number of slots; j++)
        [510] if (slot[j].slotState = On)
            [511] inLine = inLine + 1
        [512] end if
    [513] end for
    [514] if (inLine != previousInLine)
        [515] save queue event (inLine)
        [516] previousInLine = inLine
    [517] end if
[518] end for
```

Figure 5:
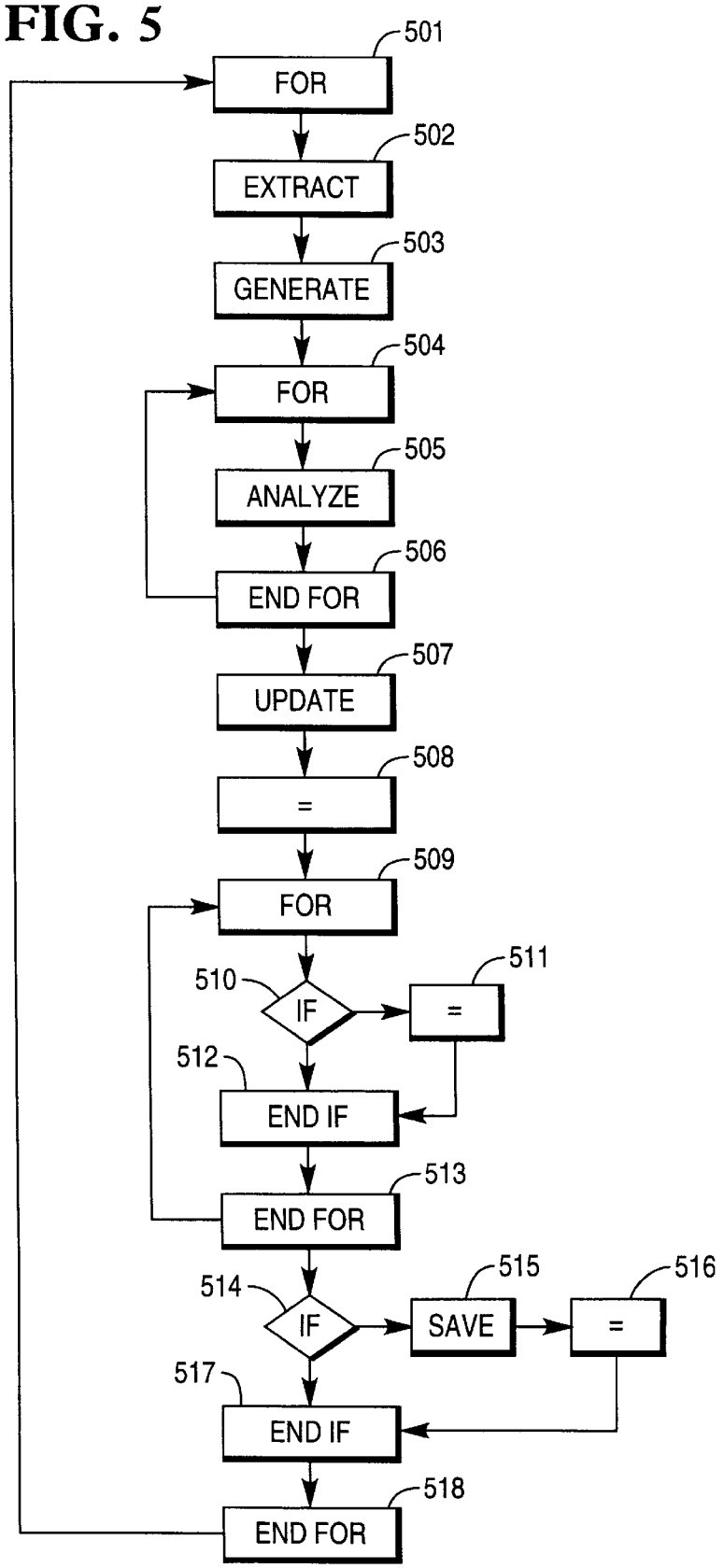

Referring to FIG. 5, for each frame input, the following is performed. In step 501, the system 130 sequentially processes each queue zone 420 performing the following functions. First, in step 502, the region of interest 440 is extracted from the input frame for the corresponding queue zone 420. The region of interest 440 corresponds to a bounding box that encloses the one or more queue zones 420. The output of the operation is a smaller frame that contains only the region of the image that corresponds to the queue zone 420 being analyzed.

Next, in step 503 an image difference is generated using the extracted frame, region of interest, 420 and the current background associated with the queue zone 420. The image difference is used to detect objects in the queue zone 420 that are not in the background. Since new objects in the scene generally exhibit a different set of gray scale intensities than the background, new objects in the scene can be detected. The following equation is used in generating the image difference.

$$\sum_{x=0}^{n}\sum_{y=0}^{m} D(x, y) = f(I(x, y), B(x, y))$$

where $f(i, b) = 1$, if $|i - b| \geq D$
$= 0$, if $|i - b| < D$

Pixels in the image difference with a value of 1 represent locations within the image where objects have been detected. The threshold value selected for the image difference operation must be large enough to eliminate noise resulting from shadows, changing lighting conditions, and other environmental factors. However, the threshold must be small enough to detect the presence of people within the scene. The threshold, D, is determined from the Difference Threshold parameter (described previously) of node 331.

Figure 4C:
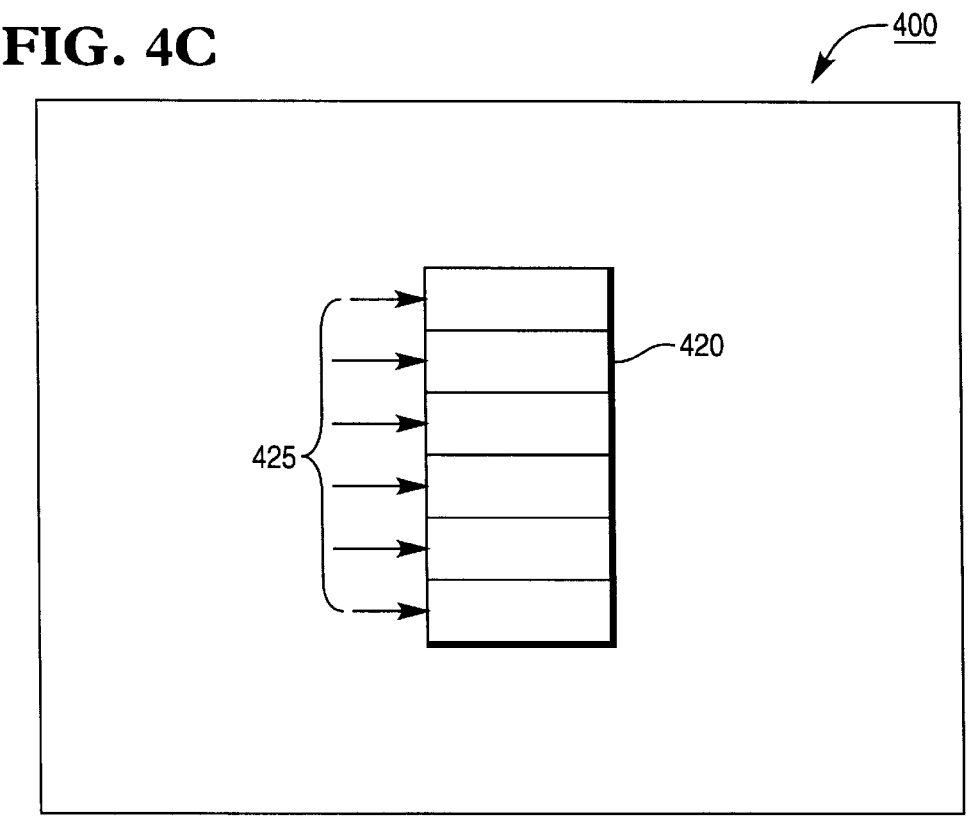
FIGS. 4C and 4D depict how a video image may be divided in accordance with the present invention.
Figure 4D:
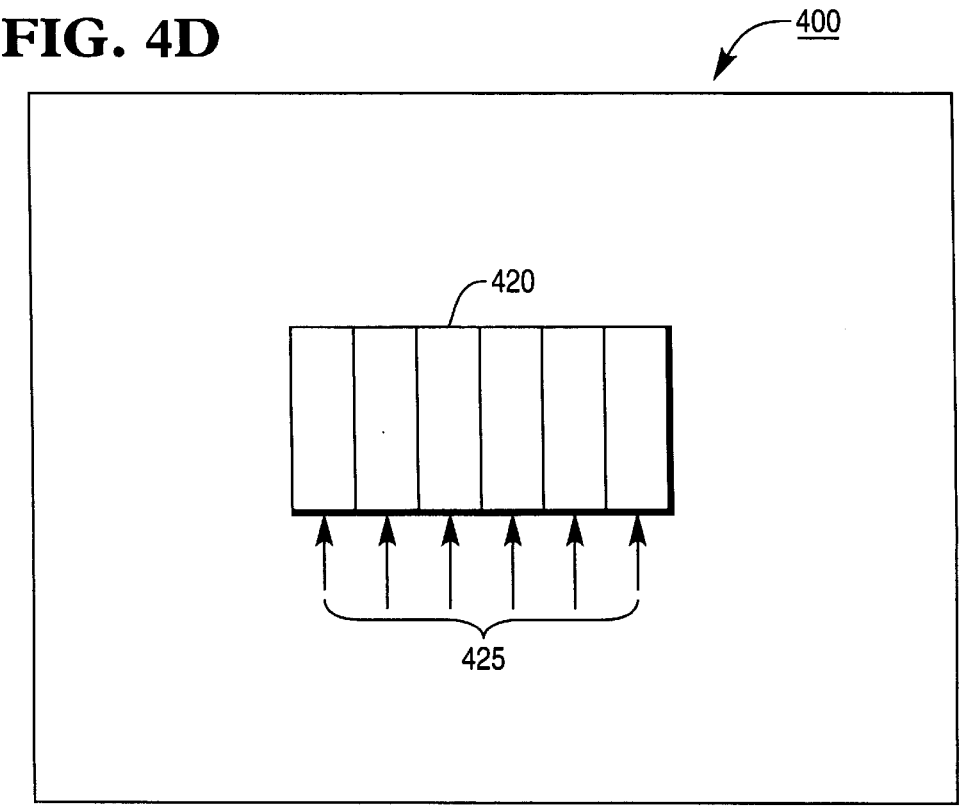

To determine the number of people in the queue, the queue zone 420 may be subdivided into a set of slots 425 based on the projected location of customers in the queue. If the customers queue in a top-to-bottom direction, the zone 420 is divided into a set of vertical slots 425, as shown in FIG. 4C. If customers queue in a left-to-right direction, the zone 420 is divided into a set of horizontal slots 425, as shown in FIG. 4D. The direction of the queue is determined from the Slot Direction parameter (described previously) of node 331.

Each slot 425 may be created such that it is approximately the size of a customer waiting in the queue. The number of slots 425 is determined by the Number of Slots parameter (described previously). In order to determine the number of people in the queue, the system determines the number of slots 425 occupied by a customer. The number of slots 425 occupied by a customer correspond to the number of customers in the queue.

The following pseudo-code describes the analysis of a slot 425, performed by the processing system 130 in a preferred embodiment. Reference is made in [brackets] in the pseudo-code to the steps illustrated in FIG. 6.

```
[601] PixelThreshold = SlotThreshold * <size of the slot>
[602] TP = total number of pixels equal to one in this slot
[603] if (TP > PixelThreshold)
    [604] currentState = On
[605] else
    [606] currentState = Off
[607] end if
[608] slot[slotIndex].slotTP = TP
[609] if slotIndex > 0
    [610] if (currentState = Off and slot[slotIndex-1].slotTP < Pixelthreshold)
        [611] TP = total number of pixels equal to one in the overlapping
    slot
        [612] if (TP > PixelThreshold)
            [613] currentState = ON
        [614] end if
    [615] end if
[616] end if
[617] if (currentState != slotState)
    [618] if (currentState != previousState)
```

```
        [619] previousState = currentState
        [620] lastTime = current system time
    [621] else if (current system time – lastTime > timeThreshold)
        [622] slotState = currentState
    [623] end if
[624] else
    [625] previousState = currentState
[626] end if
```

To determine if a slot 425 is occupied, the processing system 130 compares the total number of pixels in the image difference with a value of 1 to the slot threshold. First, in step 601 the system calculates the number of pixels that must be on for the slot threshold to be exceeded. SlotThreshold is a parameter from 0.0 to 1.0 which specifies the total percentage. The system then calculates in step 602 the number of pixels that are different, TP. In step 603, if TP exceeds the threshold, PixelThreshold, then the current state of the slot is set On in step 604. Otherwise in step 605, the state of the slot is set to Off in step 606. After step 607, in step 608 the total number of pixels that are different is stored in slotTP.

Associated with each queue is an array of slots. If the current slotindex >0 in step 609, then the system 130 checks for a situation where the customer is overlapping slot slotindex and slotindex —1 in step 610. If either slotIndex or slotIndex—1 has already been marked occupied, the overlap test is not performed. For a vertical queue configuration FIG. 4C, an overlapping slot corresponds to the top half of slotindex—1 and bottom half of slotindex. An equivalent method is used for slots running left to right. In steps 611 and 612, to determine if an overlapping slot is occupied, the system compares 1 0 the total number of pixels in the image difference with a value of 1 to the slot threshold for the overlapping slot. In step 612, if TP exceeds the threshold, PixelThreshold, then the current state of the slot is set to On in step 613. Otherwise, the state of the slot remains unchanged.

In order to eliminate spurious events generated from a customer walking through a queue without stopping, the system 130 must filter out temporary changes in the state of the queue, i.e. slots 425. This is achieved by using three variables, previousState, slotState, and lastTime. SlotState corresponds to the state of a slot after filtering spurious slot state changes. In order for slotState to be updated, the state of the slot must remain quiescent for greater than timeThreshold seconds.

Figure 6:
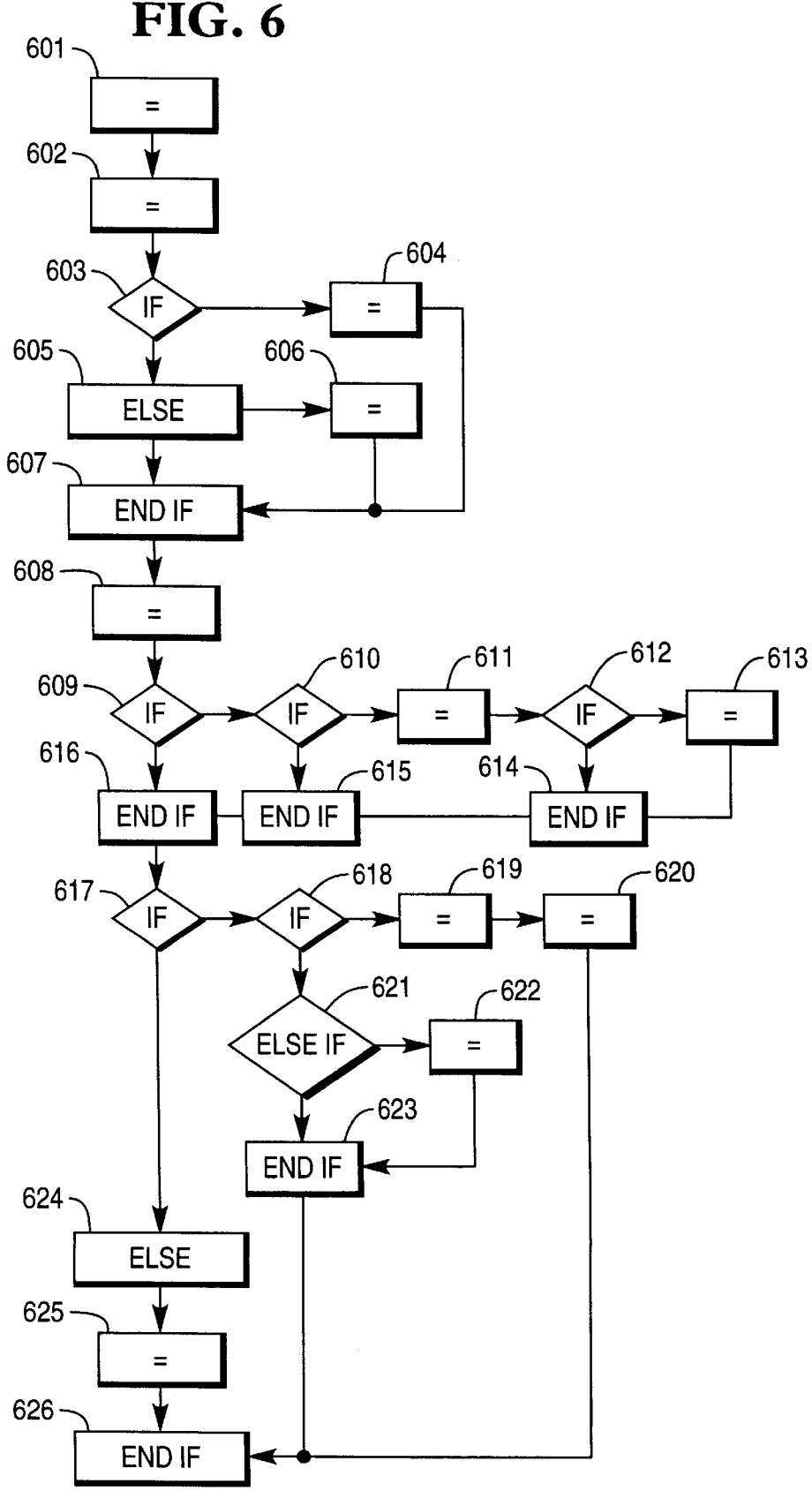

In the pseudo-code above, and in FIG. 6, if the currentState equals the previous state, only the previousState is updated. In step 617, if the currentState and slotState are different, the following occurs. In step 618, if the currentState and previousState are different, the status of previousState is updated (step 619) and the time of the update is saved (step 620). In step 621, if currentState and previousState are the same and have remained the same for greater than timeThreshold seconds, the slot status is updated in step 622. Otherwise, no action is taken, i.e. a state change or additional time is required for some action to take place.

Next, the current queue zone background is updated in step 507. Finally, the system determes the number of customers in the queue by counting the number of occupied slots 425, steps 509–517. If the number of slots 425 has changed since the previous frame, the system logs a queue event.

4. Segment-Based Queue Analysis

Figure 7:
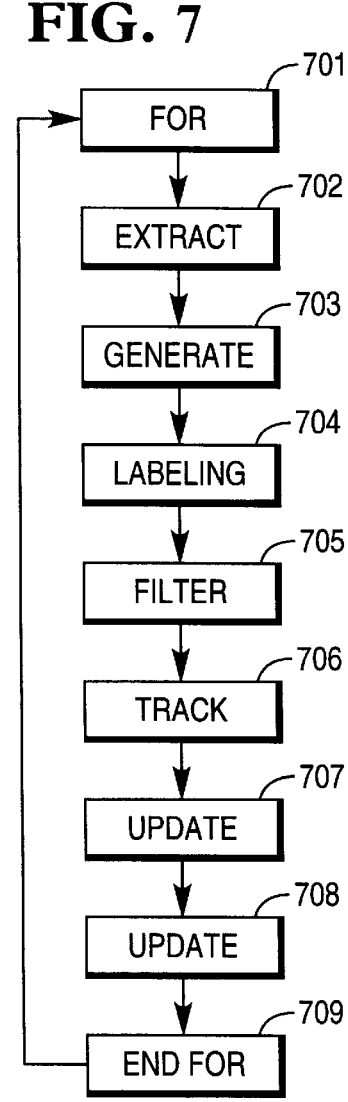
FIGS. 5–10 are additional flow diagrams depicting processes that may be performed by the present invention.

Below is the pseudo-code for the segment-based queue process. Reference is made in [brackets] in the pseudo-code to the steps illustrated in FIG. 7.

```
[701] For (i = 0; i < number of queue zones; i++)
    [702] extract the region of interest for zone i
    [703] generate the background image difference
    [704] perform region labeling
    [705] filter objects
    [706] update queue count
    [707] update current background
[708] end for
```

In step 701, for each frame input, the following is performed. The system sequentially processes each queue zone performing the following functions. First, in step 702 the region of interest 440 is extracted from the input frame for the corresponding queue zone 420. The region of interest 440 corresponds to a bounding box that encloses the queue zone 420. The output of the operation is a smaller frame that contains only the region of the image that corresponds to the queue zone being analyzed.

Next, in step 703 an image difference is generated using the extracted frame and the current background associated with the queue zone 420. The image difference is used to detect objects in the queue zone that are not in the background. Since new objects in the scene generally exhibit a different set of gray scale intensities than the background, new objects in the scene can be detected.

At this point, a binary image exists with values of 0 and 1. A pixel value of 1 indicates the pres object that is different than the background. The method used to generate the image difference is the same as described in the pixel based approach, with the following enhancement. Pixels that are located on edges, i.e. locations where one person partially occludes a second person, are set to 0. This additional step is performed so that the region labeling process described below, step 704, will identify two people. Edges are set to zero by adding the following additional constraint to the equation for image differencing.

$$\sum_{x=0}^{n}\sum_{y=0}^{m} D(x, y) = f(I(x, y), B(x, y))$$

where $f(i, b) = 1$, if $|i - b| \geq D$ and $|I(x-1, y) - I(x+1, y)| \leq T$ otherwise 0

The threshold T, is determined from the Edge Difference Threshold parameter (described previously of node 331. This is a standard image processing technique for edge detection, i.e., computing the gradient.

Next, in step 704 a region labeling operation is performed on the image difference in order to group adjacent pixels that are On in the image difference. For example, assume a portion of the binary image contains the following pixel values in TABLE 1.

TABLE 1

| 0 | 1 | 1 | 0 | 0 | 0 | 1 | 1 | 1 | 1 |
|---|---|---|---|---|---|---|---|---|---|
| 1 | 1 | 1 | 1 | 0 | 0 | 0 | 1 | 1 | 0 |
| 0 | 1 | 1 | 1 | 1 | 0 | 0 | 1 | 1 | 1 |
| 0 | 1 | 1 | 1 | 1 | 1 | 0 | 1 | 1 | 1 |
| 0 | 1 | 1 | 1 | 1 | 1 | 0 | 1 | 1 | 1 |
| 0 | 0 | 1 | 1 | 0 | 1 | 0 | 1 | 1 | 1 |
| 0 | 0 | 0 | 0 | 0 | 0 | 0 | 1 | 1 | 1 |
| 0 | 0 | 0 | 0 | 0 | 0 | 0 | 0 | 1 | 1 |
| 0 | 0 | 0 | 0 | 0 | 0 | 0 | 0 | 0 | 0 |
| 0 | 0 | 0 | 0 | 0 | 0 | 0 | 0 | 0 | 0 |

Region labeling idenifies two regions of adjacent pixels, A and B. These regions are shown below in TABLE 2.

TABLE 2

| 0 | A | A | 0 | 0 | 0 | B | B | B | B |
|---|---|---|---|---|---|---|---|---|---|
| A | A | A | A | 0 | 0 | 0 | B | B | 0 |
| 0 | A | A | A | A | 0 | 0 | B | B | B |
| 0 | A | A | A | A | A | 0 | B | B | B |
| 0 | A | A | A | A | A | 0 | B | B | B |
| 0 | 0 | A | A | 0 | A | 0 | B | B | B |
| 0 | 0 | 0 | 0 | 0 | 0 | 0 | B | B | B |
| 0 | 0 | 0 | 0 | 0 | 0 | 0 | 0 | B | B |
| 0 | 0 | 0 | 0 | 0 | 0 | 0 | 0 | 0 | 0 |
| 0 | 0 | 0 | 0 | 0 | 0 | 0 | 0 | 0 | 0 |

Regions A and B correspond to two objects that have been identified in the queue zone 420. Since noise and poor segmentation of an object with sinijlar gray level intensity to the background can result in less than optimal segmentation, it is necessary to relax the adjacency constraint. Adjacency can be defined as a distance function, being expressed in terms of pixel distance. The set of pixels adjacent to pixel $P_{ij}$ with a distance D are given below.

$$\sum_{k=-D}^{D} \sum_{l=-D}^{D} P_{i+k,j+k}$$

In the preferred embodiment, distance is a system parameter. In the example above, with a distance of 2, regions A and B would be grouped as a single object.

The ouput of the region labeling process is a set of object descriptors, one for each object or region identified in the image. Each object descriptor consists of the object centroid, the x.y corrdiante for the center of the object, and the size of the object in pixels.

After objects have been identified in the current image, a filtering operation is performed in step 705. Objects that are too small should be discarded, since these correspond to objects resulting from noise or other segmentation related problems. The filtering causes objects that are to small to be a person to be discarded.

Figure 8:
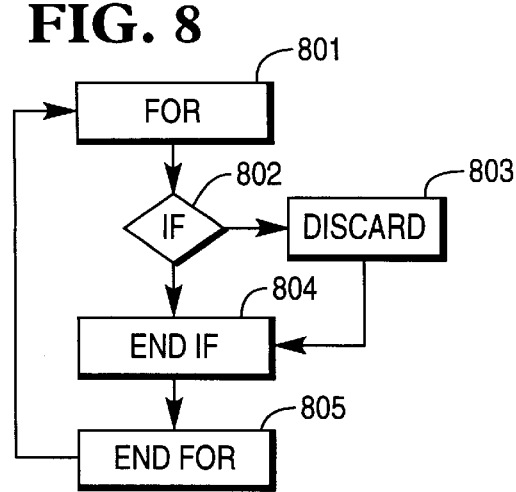

Object filtering is described further in the pseudo-code below. Reference is made in [brackets] in the pseudo-code to the steps illustrated in FIG. 8.

```
[801] for each object
    [802] if (object size < minObjectSize)
        [803] discard object
    [804] end if
[805] end for
```

At this point, the system 130 has a set of objects that should correspond to people within the scene. The total number of objects corresponds to the total number of people in the queue in step 706. Finally, the queue zone background is updated in step 707.

5. Background Adaptation

Over time, the scene that is being viewed by a camera 110 can change. These changes may result from changes in lighting conditions, i.e. night and day, or changes in the physical location of objects within the camera 110 view. In order to detect people accurately within a camera view, the system must be capable of adapting the current background to incorporate changes in the scene. Furthermore, since queue analysis zones 420 can be located at different locations within the image, individual backgrounds are maintained for each zone. The size of the background is equal to the size of the zone.

As the queue analysis approaches are based on background differencing, it is important that the background be updated over time to reflect scene changes in the real world, which may result from lighting condition changes, adding or removing of background objects, physical changes in the background environment, etc. For pixel-based queue analysis algorithm, background adaptation can be applied either on the whole region of interest 440 or on each individual slot 425. For segment-based queue analysis, background adaptation is based on the whole region of interest 440 of the input video frame.

A. Background Adaptation for Pixel-based Oueue Analysis

The pixel-based queue analysis process can use the same background adaptation approach used in display analysis, which is referred as background adaptation mode 1, and which is described in further detail in co-pending U.S. patent application Ser. No. 08/694,365, filed Aug. 8, 1996, and commonly assigned to the assignee of the present specification. That is, the algorithm monitors the frame difference between the current video frame and the background frame and counts the number of pixels that exceed a preselected threshold. If the count is less than a fixed percentage of the number of pixels within the region of interest 440 for a period longer than a given time threshold, then it captures a new background (use the current input video frame as the new background).

Another background adaptation algorithm (mode 2) updates the background based on the motion detected from the video input 115. The background will be updated if the count of the "on" pixels of the frame difference frame (frame difference between the current frame and the previous frame) is less than a given percentage of the pixels within the region of interest 440, and this situation lasts longer than a given time threshold. Instead of snapping a new background, the algorithm adds (or subtracts) a pre-defined fixed step factor s to the current background. That is, $$bg_t(x, y) = bg_{t-1}(x, y) + f(x,y), \forall (x, y) \subseteq ROI$$

where $$f(x, y) = \begin{cases} s & cf(x, y) > bg_{t-1}(x, y) \\ 0 & \text{if } cf(x, y) = bg_{t-1}(x, y) \\ -s & cf(x, y) < bg_{t-1}(x, y) \end{cases}$$

and cf(x,y) is the pixel value of the current frame at (x,y).

If the waiting period is longer than the predefined maximum waiting time—that is, the backgrounds have not been updated during the period longer than maximum waiting time—then the systems also update the background according to the above equation.

The above two approaches for background adaptation are useful whenever there are some periods that no customer is waiting at the checkout lane. Since a queue might be busy for most of the time, a more robust background update approach was developed, which is denoted as background adaptation mode 3. For this mode, there are three different conditions that allows the background to be updated:

1. The slot 425 is reasonably empty;
2. Nothing has moved in the slot 425 for a period longer than a predefined time threshold;
3. It is taking too long for any of the previous two to take place.

Similar to mode 2, mode 3 also updates the background by fixed step factors for the above three different situations. In the following, we will only describe mode 3 in detail as mode 2 is already included in mode 3.

Figure 9:
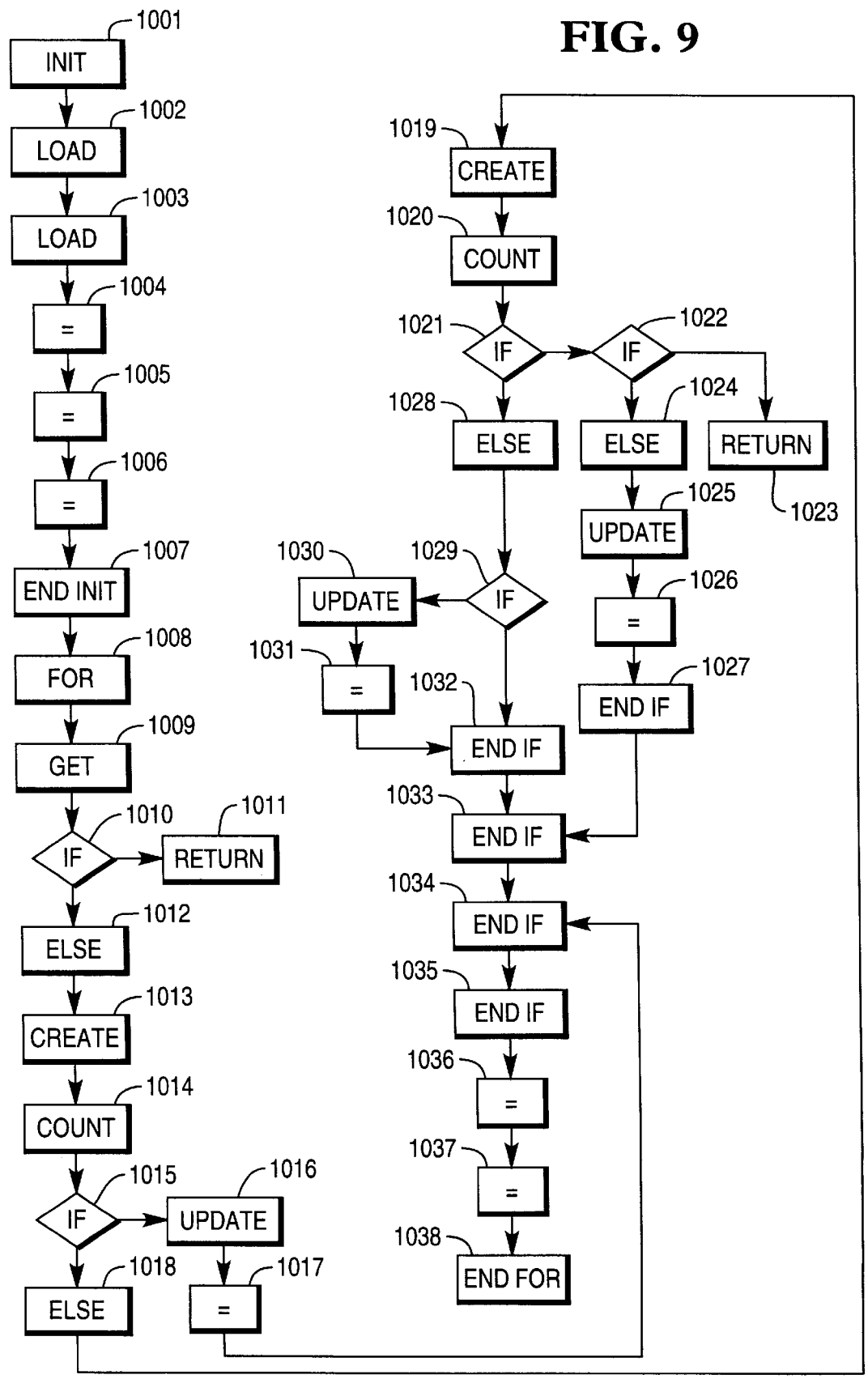
Figure 10:
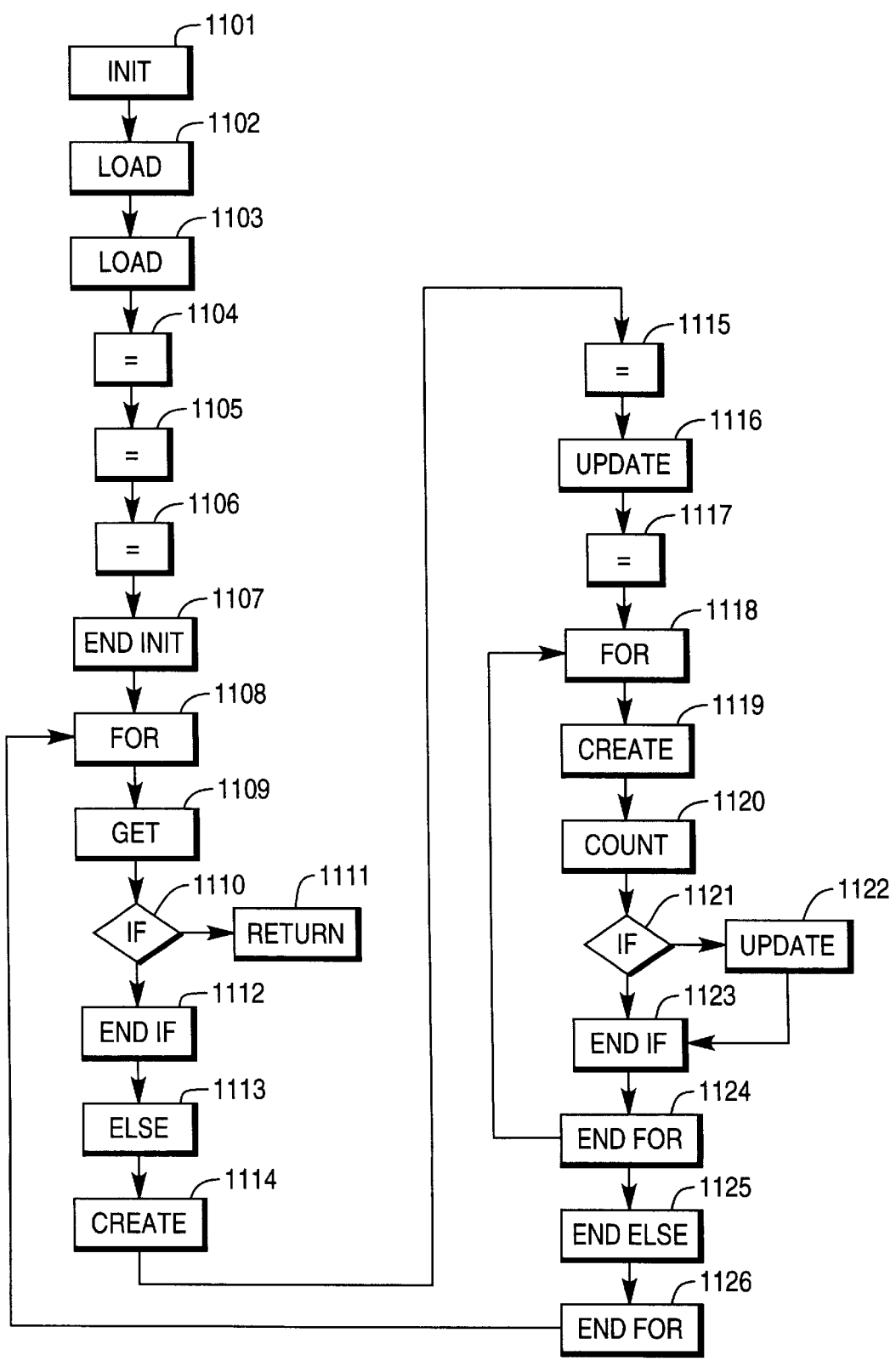

For mode 3, a separate background is maintained for each queue slot 425. These background slots can be initialized by loading a background file when starting the queue analysis task. The following pseudo-code describes the background adaptation procedure. Reference is made in [brackets] in the pseudo-code to the steps illustrated in FIGS. 9 and 10.

```
[1001] //initialization
[1002] load background for each slot
[1003] load background update parameters
[1004] last background update time = current time
[1005] last motion time = current time
[1006] previous frame = current frame
[1007] //end initialization
[1008] for(;;)
    [1009] get next frame as current frame
    [1010] if (current time - last background update time < update period)
        [1011] return
    [1012] else
        [1013] create_abs_image_difference(current frame, background frame)
        [1014] count number of active pixels
        [1015] if (number of active pixels/slot size < percentage threshold
            background difference)
            [1016] update slot background with empty update factor
            [1017] last background update time = current time
        [1018] else
            [1019] create_abs_image_difference(current frame, previous frame)
            [1020] count number of moving pixels
            [1021] if (number of moving pixels/slot size < percentage
                threshold frame difference)
                [1022] if (current time - last motion time < update period no motion)
                    [1023] return
                [1024] else
                    [1025] update slot background with update factor no motion
                    [1026] last background update time = current time
                [1027] end if
            [1028] else
                [1029] if (current time - last background update time > max waiting time)
                    [1030] update slot background with update factor exceeded wait
                    [1031] last background update time = current time
                [1032] end if
            [1033] end if
        [1034] end if
    [1035] end if
    [1036] previous frame = current frame
    [1037] last motion time = current time
[1038] end for.
```

In steps 1001–1003, the processing system 130 loads the background frame from a given file on hard disk or other storage media. If the checkout lane is empty at the beginning, the first captured frame can also serve as the initial background. During the initialization process, the parameters for background adaptation are also read. Then, the processing system sets the last background update time and the last motion time to current time in steps 1004–1005. Finally, it copies the initial input frame into the previous frame in step 1006.

Inside the for loop (steps 1008–1038), the processing system 130 first reads the next input video frame as the current frame. If the time interval between current time and last background update time is less than the given time threshold, update period, the program returns without updating the background (1010–1011). Otherwise, in steps 1013–1014, it calculates the absolute value of the image difference between the current frame and the background frame. The next step compares the absolute value of each frame difference pixel with a selected threshold (amplitude threshold of background difference) and counts the number of pixels that have a greater absolute background difference than the amplitude threshold (number of active pixels).

The next if statement (1015) compares the number of active pixels with a preselected percentage of the total pixels of the given slot. In steps 1016–1017, if the number of active pixels is smaller than the threshold, then the slot is considered empty, the background will be updated with the empty update factor (equation (1)) and the last background update time will be set to current time.

If the slot is not empty, beginning in step 1019 the algorithm determines if any motion occurred in this slot. It calculates the absolute value of the frame difference between the current frame and the previous frame and counts the number of pixels that have greater absolute frame difference sets the current frame as the previous frame and the current time as the last motion time.

B. Background Adaptation for Segment-based Queue Analysis

There are three background adaptation options for segment-based queue analysis, in a preferred embodiment. The first option is to update the whole background of the region of interest 440 with the same algorithm as pixel-based queue analysis background adaptation. The second option is to divide the whole region of interest 440 into several small slots and then use the same background adaptation algorithm of pixel-based queue analysis. The last option is given in the following pseudo code. Reference is made in [brackets] in the pseudo-code to the steps illustrated in FIGS. 11A and 11B.

```
[1101] //initialization
[1102] load background for each slot
[1103] load background update parameters
[1104] last background update time = current time
[1105] last motion time = current time
[1106] previous frame = current frame
[1107] //end initialization
[1108] for(;;)
        [1109] get next frame as current frame
        [1110] if (current time - last background update time < update period)
            [1111] return
        [1112] else
            [1113] create_abs_image_difference(current frame, background frame)
            [1114] current segment = segment abs_image_difference
            [1115] update background area with background update factor
            [1116] last background update time = current time
            [1117] for (each segmented object area)
                [1118] create_abs_image_difference(current frame, previous frame)
                [1119] count number of moving pixels
                [1120] if (number of moving pixels/current object size < object percentage)
                    [1121] update background in the segmented object area with update factor no motion
                [1122] end if
            [1123] end for loop
        [1124] end if
[1125] end for loop
``` value than a pre-determined amplitude threshold of frame difference (number of moving pixels). In step 1021, if the number of moving pixels is less than a given percentage of the total pixels of the slot (no motion), then the algorithm in steps 1022–1027 compares the time interval between current time and last motion time with the update period no motion (equation (1)). If the time interval is smaller than the no motion time threshold, that is, the no motion period is not long enough, the program just returns and does not update the background. Otherwise, the algorithm updates the background with the update factor on motion and resets the last background update time to current time.

If the algorithm detected there is motion in the slot, that is, the number of moving pixels exceeds the percentage threshold, the algorithm calculates the time interval between current time and the last background update time beginning in step 1029. In step 1029, if this waiting time is greater than the maximum waiting time, in steps 1030–1031 it will update the background with the update factor exceeded wait (equation (1)). Finally, in steps 1036–1037 the algorithm The above background adaptation process operates according to the segmentation results. After initialization in steps 1101–1107, whenever the time interval between the current time and the last background update time exceeds the time threshold of update period in step 1110, the processing system 130 updates the segmented background area with a larger update factor; it calculates the absolute value of the frame difference between the current frame and the previous frame for each segmented object area and counts the number of pixels that has greater absolute frame difference value than a predetermined amplitude threshold of frame difference (number of moving pixels) within that object area in steps 1113–1119. In step 1120, if the number of moving pixels is less than a given percentage of the total pixels of the object (object percentage), then the processing system 130 updates the background corresponding to the object area with a smaller update factor (update factor no motion) in step 1121. The adaptation based on object area is designed to deal with situations that an object is added or removed to the original background environment. In this case, even if there is an area with larger background differences, the background can still be updated gradually.

6. Alternative Background Update Algorithm

In addition to the background update formula previously discussed, which updates background by a fixed step factor, the following process (defined in terms of an equation) updates the background according to a percentage factor a, that is, $$bg_t(x,y)=a \times bg_{t-1}(x,y)+(1-a) \times cf(x,y)=cf(x,y)+a \times (bg_{t-1}(x,y)-cf(x,y)), \quad (2)$$

where $bg_t$ is the new updated background, $bg_{t-1}$ is the old background, and cf is the current input video frame. In one embodiment, this process can be implemented with a 256 by 256 lookup table.

7. System Output

The output generated by the processing system 130 of the present queue analysis invention may, in one embodiment, be an event stream that describes the number of people, etc. waiting at a service point. For example, the processing system 130 may generate data corresponding to the number of people waiting for service at any point in time, the amount of time they have waited, in addition to many other types of information relating to the queue.

In one embodiment, the processing system may store such information regarding the queue in a binary file, on the storage device 150, or any other suitable device. This file may be referred to as an event file. Event files are files created for each system that is performing queue analysis. Queue analysis events may, for example, represent one or more customers entering or exiting a queue. That is, each time a customer enters or exits the queue, and remains longer than a minimum time period, a new event is generated.

There may therefore be a one-to-one correspondence between an event and the length of the queue. Each time the length of the queue changes, a new event is generated.

The following Table 3 describes a general format that may be used for a queue event stored on device etc.:

TABLE 3

| field | function |
| --- | --- |
| event identifier | identifies the event type |
| queue id | identifies the queue within the camera 110 view |
| count | indicates the number of customers in the queue |
| timestamp | indicates the time of event creation |

Once created, the queue event data stored on device may be used to perform various types of statistical analysis, in either real-time or at periodic intervals. For example, once the queue data on device is created, processing system 130 may be programmed to: determine the average wait time by a person in the queue; the average number of people waiting in the queue; how many people left the queue before reaching the end of the line; how the people within the queue interacted with each other or with other objects in and around the queue (e.g., promotional displays); etc. Processing system 130 may also be programmed with sound to perform real-time alerts, such as by sounding an alarm once the queue reaches a certain length (so that management may summons additional cashiers, for example), etc. It will be readily understood by persons having ordinary skill in the art that the types of analysis that may be performed on the queue data are virtually endless.

Although the present invention has been described with particular reference to certain preferred embodiments thereof, variations and modifications of the present invention can be effected within the spirit and scope of the following claims.

What is claimed is:

1. A system for detecting persons standing in a queue, comprising:
   (a) a video camera positioned to view a selected area of interest, the video camera providing a video signal output;
   (b) a frame grabber for converting the video signal output into a digital video image;
   (c) a processing system for analyzing the digital video image, the processing system performing the following steps:
      (1) dividing the digital video image into a plurality of slots, each slot approximately the size of a person within the digital video image;
      (2) generating an image difference for each slot;
      (3) determining from the image difference whether a slot is occupied by a person; and
      (4) determining whether a person overlaps adjacent slots, if it is determined that neither adjacent slot is occupied by a person, by defining a slot overlapping the adjacent slots and detecting whether the overlapping slot is occupied by a person.

2. A system according to claim 1, wherein the image difference is generated by subtracting the value of each pixel in a background image associated with the video image from its associated pixel in the video image.

3. A system according to claim 2, wherein a value of 1 is assigned for each difference that exceeds a difference threshold and assigning a value of 0 for each difference that is less than the difference threshold.

4. A system according to claim 3, wherein the systems determines whether a slot is occupied by a person by determining whether the number of 1 values in the image difference for the slot exceeds a pixel threshold.

5. A system according to claim 1, wherein the processing system performs the following additional step:
   (5) updating the background image associated with the video image.

6. A system according to claim 1, wherein the system eliminates spurious events generated from a customer walking through a queue without stopping by filtering out temporary changes in the state of the queue.

7. A system for detecting persons standing in a queue, comprising:
   (a) a video camera positioned to view a selected area of interest, the video camera providing a video signal output;
   (b) a frame grabber for converting the video signal output into a digital video image;
   (c) a processing system for analyzing the digital video image, the processing system performing the following steps:
      (1) extracting a region of interest from the video image;
      (2) generating an image difference by subtracting the value of each pixel in a background image associated with the extracted region of interest from its associated pixel in the extracted region of interest, and assigning a value of 1 for each difference that exceeds or is equal to a difference threshold and assigning a value of 0 for each difference that is less than the difference threshold;
      (3) detecting the presence of edges in the region of interest;

(4) setting all detected edges to 0;

(5) performing a region labeling operation on the image difference in order to group adjacent pixels with a value of 1 into objects; and (6) counting the number of objects to determine the number of persons in the region of interest.

8. A system according to claim 7, wherein the processing system performs the following additional step (7):

(7) updating the background image associated with the video image.

9. A system according to claim 8, wherein in step (7) the whole background of the region of interest is updated.

10. A method for detecting persons standing in a queue, comprising the following steps:

(a) positioning a video camera to view a selected area of interest to provide a video signal output;

(b) converting the video signal output into a digital video image;

(c) dividing the digital video image into a plurality of slots, each slot approximately the size of a person within the digital video image;

(d) generating an image difference for each slot;

(e) determining from the image difference whether a slot is occupied by a person; and (f) determining whether a person overlaps first and second adjacent slots, if it is determined that neither adjacent slot is occupied by a person, by defining a slot overlapping the adjacent slots and detecting whether the overlapping slot is occupied by a person.

11. A method for detecting persons standing in a queue, comprising the following steps:

(a) positioning a video camera to view a selected area of interest, the video camera providing a video signal output;

(b) converting the video signal output into a digital video image;

(c) extracting a region of interest from the video image;

(d) generating an image difference by subtracting the value of each pixel in a background image associated with the extracted region of interest from its associated pixel in the extracted region of interest, and assigning a value of 1 for each difference that exceeds or is equal to a difference threshold and assigning a value of 0 for each difference that is less than the difference threshold;

(e) detecting the presence of edges in the region of interest;

(f) setting all detected edges to 0;

(g) performing a region labeling operation on the image difference in order to group adjacent pixels with a value of 1 into objects; and (h) counting the number of objects to determine the number of persons in the region of interest.

12. A method for detecting persons standing in a queue, comprising the following steps:

(a) positioning a video camera to view a selected area of interest to provide a video signal output;

(b) converting the video signal output into a digital video image;

(c) dividing the digital video image into a plurality of slots, each slot approximately the size of a person within the digital video image;

(d) generating an image difference for each slot;

(e) determining from the image difference whether a slot is occupied by a person; and (f) determining whether a person overlaps first and second adjacent slots by:

(1) determining whether either adjacent slot is occupied by a person;

(2) defining an overlapping slot comprising adjacent halves of each of the adjacent slots if it is determined that neither adjacent slot is occupied by a person; and (3) detecting whether the overlapping slot is occupied by a person.

13. A method for detecting persons standing in a queue, comprising the following steps:

(a) positioning a video camera to view a selected area of interest, the video camera providing a video signal output;

(b) converting the video signal output into a digital video image;

(c) extracting a region of interest from the video image;

(d) generating an image difference by subtracting the value of each pixel in a background image associated with the extracted region of interest from its associated pixel in the extracted region of interest, and assigning a value of I for each difference that exceeds or is equal to a difference threshold and assigning a value of 0 for each difference that is less than the difference threshold;

(e) detecting the presence of edges in the region of interest by computing a gradient between adjacent pixels and determining whether the gradient exceeds an edge difference threshold;

(f) setting all detected edges to 0;

(g) performing a region labeling operation on the image difference in order to group adjacent pixels with a value of 1 into objects; and (h) counting the number of objects to determine the number of persons in the interest.

* * * * *

UNITED STATES PATENT AND TRADEMARK OFFICE
CERTIFICATE OF CORRECTION

PATENT NO. : 6,195,121 B1
DATED : February 27, 2001
INVENTOR(S) : Jianzhong Huang et al.

Page 1 of 1

It is certified that error appears in the above-identified patent and that said Letters Patent is hereby corrected as shown below:

<u>Column 17,</u>
Line 2, delete "ope ration" and substitute -- operation --.

<u>Column 18,</u>
Line 49, after "the" insert -- region of --.

Signed and Sealed this

Twelfth Day of March, 2002

Attest:

JAMES E. ROGAN
*Director of the United States Patent and Trademark Office*

*Attesting Officer*